UNITED STATES PATENT OFFICE.

GUSTAV LILIENTHAL, OF MELBOURNE, AUSTRALIA.

MANUFACTURING ARTIFICIAL STONE.

SPECIFICATION forming part of Letters Patent No. 335,707, dated February 9, 1886.

Application filed October 27, 1885. Serial No. 181,102. (No specimens.)

*To all whom it may concern:*

Be it known that I, GUSTAV LILIENTHAL, a subject of the King of Prussia, residing at Melbourne, Australia, have invented new and useful Improvements in Manufacturing Artificial Stones, of which the following is a specification.

My invention is a composition of matter adapted to the manufacture of artificial stone.

In making the artificial stone I use a composition consisting, essentially, of Keene's marble cement, (alum gypsum,) slaked lime, and curdled milk. I have found that the following proportions produce good results: I take a given quantity of slaked lime reduced to a powder—say one hundred parts—and mix therewith the same weight or nearly the same weight of Keene's marble cement. The quantity of cement should never exceed the lime in weight, and preferably is slightly less. These materials are mixed together and diluted with curdled milk and worked into a stiff paste that is just kneadable. The mass is then cut or separated into pieces the size of the stones or other articles to be manufactured and pressed into suitable molds, after which they are dried in the open air or in a temperature below 100° centigrade.

In manufacturing colored stones, mineral or aniline colors, mixed with a binding material or used dry, may be added to the composition.

Stones made of this composition may be used for a variety of purposes, such as mosaic pavements, model stones, and the like.

What I claim is—

The within-described composition of matter for the manufacture of artificial stones and the like, consisting of slaked lime, Keene's cement, and curdled milk, in substantially the proportions set forth.

In testimony whereof I have signed my name to this specification in the presence of two subscribing witnesses.

GUSTAV LILIENTHAL.

Witnesses:
   G. HÜLSMANN,
   B. ROI.